United States Patent
McCoy et al.

(10) Patent No.: US 12,084,129 B2
(45) Date of Patent: *Sep. 10, 2024

(54) FIFTH WHEEL HITCH ISOLATION SYSTEM

(71) Applicant: HORIZON GLOBAL AMERICAS INC., Plymouth, MI (US)

(72) Inventors: Richard W. McCoy, Granger, IN (US); Eric J. Stanifer, Mishawaka, IN (US)

(73) Assignee: HOPKINS GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,020

(22) Filed: Jan. 23, 2023

(65) Prior Publication Data

US 2023/0406423 A1 Dec. 21, 2023

Related U.S. Application Data

(63) Continuation of application No. 16/879,907, filed on May 21, 2020, now Pat. No. 11,560,187, which is a continuation of application No. 15/456,626, filed on Mar. 13, 2017, now Pat. No. 10,661,846, which is a continuation of application No. 13/190,878, filed on Jul. 26, 2011, now Pat. No. 9,592,863.

(60) Provisional application No. 61/367,695, filed on Jul. 26, 2010.

(51) Int. Cl.
B62D 53/08 (2006.01)

(52) U.S. Cl.
CPC ......... B62D 53/0885 (2013.01); B62D 53/08 (2013.01); B62D 53/0807 (2013.01); B62D 53/0842 (2013.01)

(58) Field of Classification Search
CPC .............. B62D 53/0885; B62D 53/08; B62D 53/0807; B62D 53/0842
See application file for complete search history.

(56) References Cited

U.S. PATENT DOCUMENTS

| | | | |
|---|---|---|---|
| 6,581,951 B2 * | 6/2003 | Lange | B62D 53/0885 280/489 |
| 7,753,391 B1 * | 7/2010 | Hesse | B62D 53/061 280/439 |
| 8,430,418 B2 * | 4/2013 | McCoy | B60D 1/249 280/438.1 |
| 9,145,178 B2 * | 9/2015 | Erickson | B60D 1/015 |
| 9,592,863 B2 * | 3/2017 | McCoy | B62D 53/08 |

* cited by examiner

*Primary Examiner* — Jacob D Knutson
*Assistant Examiner* — Marlon A Arce

(57) ABSTRACT

A fifth wheel hitch may include at least one support frame capable of engaging with a towing vehicle. The fifth wheel hitch may further include a cross-member attached to the support frame and an isolation system operatively coupled with the cross-member. The isolation system may include a beam engaged with the cross-member about a first axis, where rotation of the beam about the first axis is dampened via a cross-member isolator. The isolation system may also include a skid plate engaged with the beam about a second axis, where rotation of the skid plate about the second axis is dampened via a wing isolator.

8 Claims, 5 Drawing Sheets

FIFTH WHEEL HITCH ISOLATION SYSTEM

CROSS-REFERENCE TO RELATED APPLICATION

This application is a continuation of U.S. application Ser. No. 16/879,907, entitled "Fifth Wheel Hitch Isolation System," filed May 21, 2020, which is a continuation of U.S. application Ser. No. 15/456,626, entitled "Fifth Wheel Hitch Isolation System," filed on Mar. 13, 2017, now U.S. Pat. No. 10,661,846, which is a continuation of U.S. application Ser. No. 13/190,878, now U.S. Pat. No. 9,592,863 entitled "Fifth Wheel Hitch Isolation System," filed on Jul. 26, 2011, which claims benefit from U.S. Provisional Patent Application No. 61/367,695, entitled "Fifth Wheel Hitch Isolation System," filed on Jul. 26, 2010, which are hereby all incorporated in their entirety by reference.

TECHNICAL FIELD

The present invention generally relates to a fifth wheel hitch and, more particularly, to a fifth wheel hitch isolation system.

BACKGROUND

The towing industry has developed a number of methods and apparatuses for securing a towed vehicle or trailer to a towing vehicle. For example, hitch balls have been developed to be attached to the bumper or other rear portion of a towing vehicle. A trailer or towed vehicle equipped with a coupler mechanism may be attached to the towing vehicle by placing the coupling mechanism over the hitch ball and securing the coupler to the ball. Similar apparatus using hitch receivers attached to the rear of a towing vehicle and drawbars may be used to secure trailers to towing vehicles.

Some trailers may be designed to carry heavy loads. Connecting such a trailer to a ball hitch on a bumper of a towing vehicle, however, may be impractical. When a trailer load is heavy when compared to the weight of the towing vehicle, applying the trailer load to the rear of the towing vehicle may cause undesirable towing conditions. In such situations, the trailer may often be secured to a load bed of a towing vehicle, whereby the force of the trailer load is generally applied over or near the rear axle of the towing vehicle to create a potentially more stable towing condition. In addition, such an arrangement may put much of the force of the trailer load onto structural members of the towing vehicle, such as the frame.

There are generally two arrangements for securing a trailer to the load bed of a towing vehicle—a fifth wheel hitch and a gooseneck hitch. A gooseneck hitch is generally attached to a hitch ball that may be located in the load bed of the towing vehicle. The hitch ball may typically be secured to the frame or load bed of the towing vehicle. A fifth wheel hitch may generally be positioned in a load bed of the towing vehicle and secured either to the load bed or directly to the frame of the towing vehicle. Fifth wheel hitches may generally be attached to the load bed or frame whereby tools may generally be required to remove fasteners and other connectors to install or uninstall a fifth wheel hitch to the load bed of a towing vehicle.

Typically, a fifth wheel trailer may include a king pin that may be used to couple the trailer to the towing vehicle. Fifth wheel trailers are commonly coupled to towing vehicles that include a load bed, such as a pick-up truck or a flatbed truck. A fifth wheel hitch assembly may be secured in the load bed of the towing vehicle, whereby the king pin of the trailer is commonly coupled to the fifth wheel hitch assembly.

Fifth wheel hitch assemblies may typically include a support frame for securing the hitch assembly to the load bed of the towing vehicle. The support frame may include a pair of mounting rails, a pair of side brackets, and a head assembly. The mounting rails may be bolted to the load bed or the frame of the towing vehicle. The side brackets may be secured to the mounting rails and the head assembly may be secured to the side brackets. The head assembly may be secured in a manner that allows the head assembly to pivot fore-and-aft with respect to the towing vehicle.

The head assembly may include a jaw assembly for securing the king pin of the trailer to the towing vehicle. The jaws may be moveable to secure and release the king pin extending from the trailer. The jaws may also be arranged such that an operator may manually toggle the jaws between a position in which the king pin is secured in the jaws and a position in which the king pin is released from the jaws. When the king pin is secured in the jaws, the trailer is secured to the towing vehicle and may be towed by the towing vehicle. When the king pin is released from the jaws, the king pin may be removed from the jaws, decoupling the trailer from the towing vehicle.

Fifth wheel hitches may normally be arranged such that the king pin is aligned over or near the rear axle and approximately equidistant between the rear wheels of the towing vehicle. Placing the king pin over the rear axle may also provide for sufficient clearance between the front edge of the trailer and the rear edge of the towing vehicle cabin. Such an arrangement may facilitate towing the trailer at operational speeds, such as highway speeds.

Driving a fifth wheel trailer may often be very rough, whereby large shocks can pass through the trailer hitch between the trailer and the towing vehicle. Providing a rigid trailer hitch, however, may not provide an adequate or proper cushion between the stiff trailer and the towing vehicle, whereby the people traveling in the towing vehicle may not have a comfortable ride.

Typically, fifth wheel hitches have either used large volume air bags, fluid shock absorbers, or have been forced to use a dense polymer to limit the resulting displacement. As a result, fifth wheel hitches have required a large amount of space and have not been able to adequately dampen high frequency vibrations as well as low frequency vibrations. In addition, fifth wheel hitches generally dampen a limited number of degrees and not multiple axes.

SUMMARY

A fifth wheel hitch may include at least one support frame capable of engaging with a towing vehicle. The fifth wheel hitch may further include a cross-member attached to the support frame and an isolation system operatively coupled with the cross-member. The isolation system may include a beam engaged with the cross-member about a first axis, where rotation of the beam about the first axis is dampened via a cross-member isolator. The isolation system may also include a skid plate engaged with the beam about a second axis, where rotation of the skid plate about the second axis is dampened via a wing isolator.

In an alternative embodiment, an isolation system of a fifth wheel hitch may include a cross-member, a beam rotationally secured with the cross-member about a first axis, and a dampener secured to the beam about said first axis, where the dampener dampens rotation of the beam about the first axis.

In yet another alternative embodiment, an isolator system for a fifth wheel hitch may include a cross-member, a beam having at least one end portion, where the beam is rotationally secured with the cross-member, a skid plate rotationally secured to the beam, where the skid plate is capable of rotating about an axis, and a dampener secured to the end portion of the beam, where the dampener dampens vibrations of the skid plate about the axis.

DESCRIPTION OF THE DRAWINGS

The operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
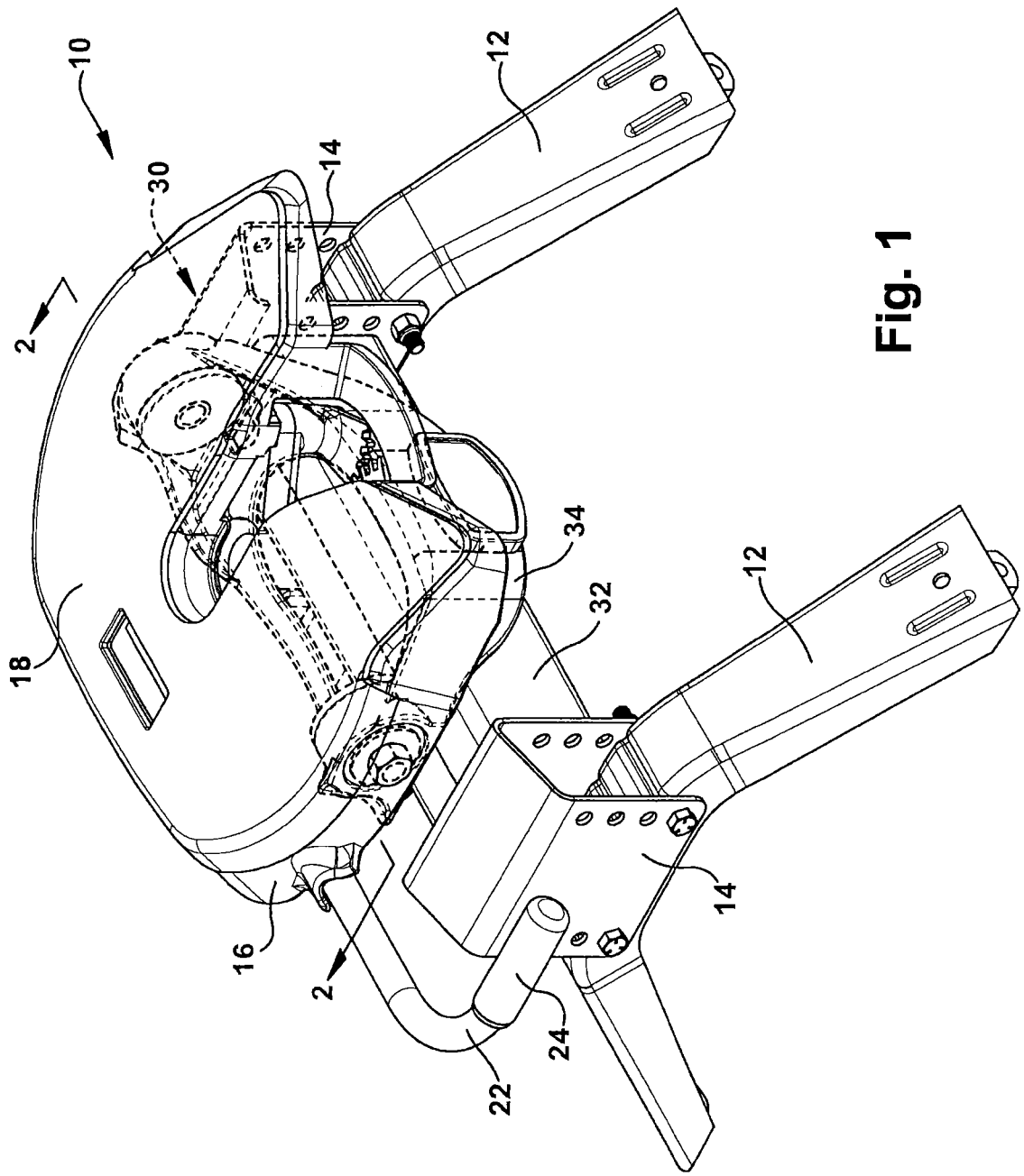
FIG. 1 is a perspective view of a fifth wheel hitch assembly having an isolation system according to the present teachings.
Figure 2:
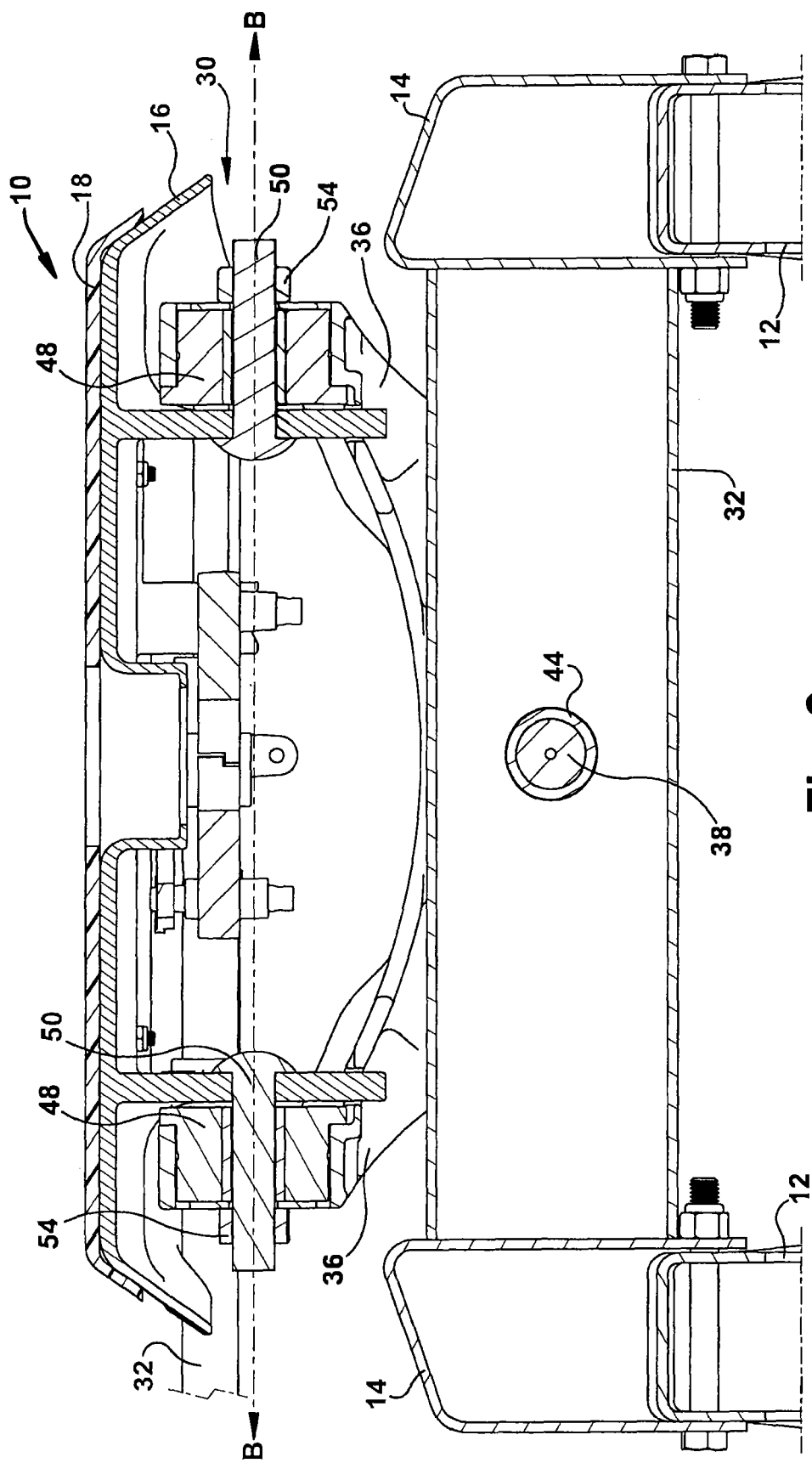
FIG. 2 is a cross-sectional view of the fifth wheel hitch assembly taken along lines 2-2 of FIG. 1.

A fifth wheel hitch assembly 10 is shown in FIGS. 1 and 2. The fifth wheel hitch assembly 10 may be positioned in a load bed of a towing vehicle, such as a truck (not shown), and secured either to the load bed or directly to the frame of the towing vehicle below the load bed. Once secured to the towing vehicle, a king pin (not shown) of a towed vehicle (not shown) or trailer may be coupled to the fifth wheel hitch assembly 10. The fifth wheel hitch assembly 10 may be fabricated out of any appropriate types of materials, such as metal.

The fifth wheel hitch assembly 10 may include at least one support frame 12, at least one mounting bracket 14, a head or skid plate 16 and an isolation system 30. By way of a non-limiting example, the fifth wheel hitch assembly 10 may include a pair of support frames 12. The support frames 12 may be of any appropriate shape, size, type or configuration. For example, the support frames 12 may be of a generally curved shape, in a substantially arched shaped, or the like.

The support frames 12 may be located at any appropriate position on the fifth wheel hitch assembly 10, such as on each side of the hitch assembly 10. The support frames 12 may be utilized to secure the fifth wheel hitch assembly 10 to the load bed of the towing vehicle. For example, the support frames 12 may be secured to the load bed or the frame of the towing vehicle below the load bed by any appropriate means, such as with fasteners, or the like. More specifically, the support frames 12 may be secured to rails (not shown) that are attached to the frame (not shown) of the towing vehicle below the load bed. In this embodiment, the rails (not shown) may include a plurality of apertures (not shown) below the load bed and the load bed may include correspondingly shaped and positioned apertures (not shown) such that the apertures of the rails may include a fastening device (not shown) such that the support frames 12 may be secured to the fastening device (not shown).

Each support frame 12 may be attached to a mounting bracket 14, whereby the fifth wheel hitch assembly 10 may include a pair of mounting brackets 14. The mounting brackets 14 may be of any appropriate shape, size, type or configuration. By way of a non-limiting example, the mounting brackets 14 may be of a general C-shape or three sided square, rectangular shape, or the like. The mounting brackets 14 may be located at any appropriate position on the fifth wheel hitch assembly 10, such as located above each support frame 12.

The head or skid plate 16 may be of any appropriate shape, size, type or configuration. By way of a non-limiting example, the skid plate 16 may be of a general horseshoe shape, a substantially semi-circular shape, a substantially curved shaped or the like. The skid plate 16 may be located at any appropriate position on the fifth wheel hitch assembly 10, such as at a generally central location above the isolation system 30. The skid plate 16 may be utilized to engage with the king pin (not shown) of the trailer.

The fifth wheel hitch assembly 10 may also include a cover 18, an example of which is shown in FIGS. 1 and 2. The cover 18 may be of any appropriate shape, size, type or configuration, such as a generally planar horseshoe shape, substantially semi-circular shape, a substantially curved shaped or the like. For example, the cover 18 may be of similar shape to that of the skid plate 16. The cover 18 may be located at any appropriate position on the fifth wheel hitch assembly 10, such as located above the skid plate 16.

The isolation system 30 may be of any appropriate shape, size, type or configuration. The isolation system 30 may be located at any appropriate position on the fifth wheel hitch assembly 10, such as located between the load bed of the towing vehicle and the skid plate 16 as shown in FIGS. 1 and 2. The isolation system 30 may be utilized to operatively engage with the skid plate 16.

The fifth wheel hitch assembly 10 may include a handle 22. The handle 22 may be of any appropriate shape, size, type or configuration. By way of a non-limiting example, the handle 22 may be of a general tubular L-shape, a substantially T-shape, or the like. The handle 22 may be located at any appropriate position on the fifth wheel hitch assembly 10, such as located adjacent the isolation system 30 and below the skid plate 16. The handle 22 may be utilized to operate engagement of the skid plate 16 with the king pin (not shown).

The handle 22 may include a grip 24. The grip 24 may be of any appropriate shape, size, type or configuration. By way of a non-limiting example, the grip 24 may be of a general tubular shape similar to that of the handle 22, such as a general tubular L-shape, a substantially T-shape, or the like. The grip 24 may be located at any appropriate position on the handle 22, such as at an end of the handle 22. The grip 24 may provide the user with a comfortable surface to grip the handle 22 when adjusting the fifth wheel hitch assembly 10, as well as being ergonomically shaped to further attempt to ease the use of the handle 22.

The isolation system 30 may include a cross-member 32 and a pivot beam 34. The cross-member 32 may be of any appropriate shape, size, type or configuration. By way of a non-limiting example, the cross-member 32 may be of a generally square or rectangular tubular shape, or the like. The cross-member 32 may be located at any appropriate position on the fifth wheel hitch assembly 10, such as located between each support frame 12 and mounting bracket 14, an example of which is shown in FIGS. 1-4.

The mounting brackets 14 may be utilized to secure the cross-member 32 to the support frames 12. The cross-member 32 may be secured to the mounting brackets 14 by any appropriate means, such as by welding, fasteners, or the like. The cross-member 32 may be utilized to secure the pivot beam 34.

The pivot beam 34 may be of any appropriate shape, size, type or configuration. By way of a non-limiting example, the pivot beam 34 may be of a generally curved or cradle shape, a substantially saddled shape, or any other such shape. Moreover, the pivot beam 34 may include a pair of wings 36. The pivot beam 34 may be located at any appropriate position on the fifth wheel hitch assembly 10, such as located between each support frame 12 and mounting bracket 14 and adjacent the cross-member 32. The pivot beam 34 may be secured to the cross-member 32 by any appropriate means, such as with fasteners. The pivot beam 34 may be utilized to secure the head or skid plate 16.

Figure 3:
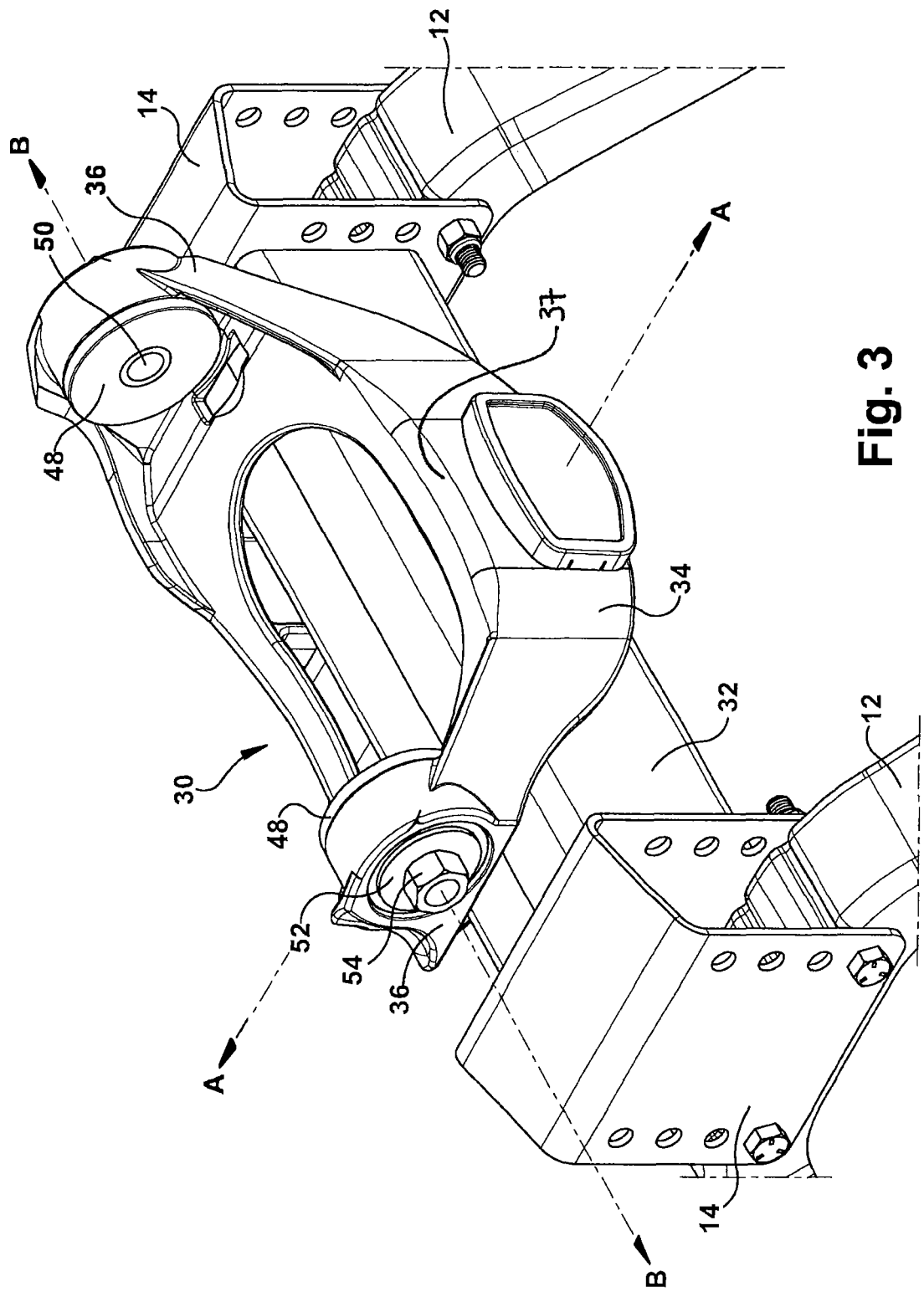
FIG. 3 is a partial perspective view of the isolation system of the fifth wheel hitch assembly of FIG. 1.
Figure 4:
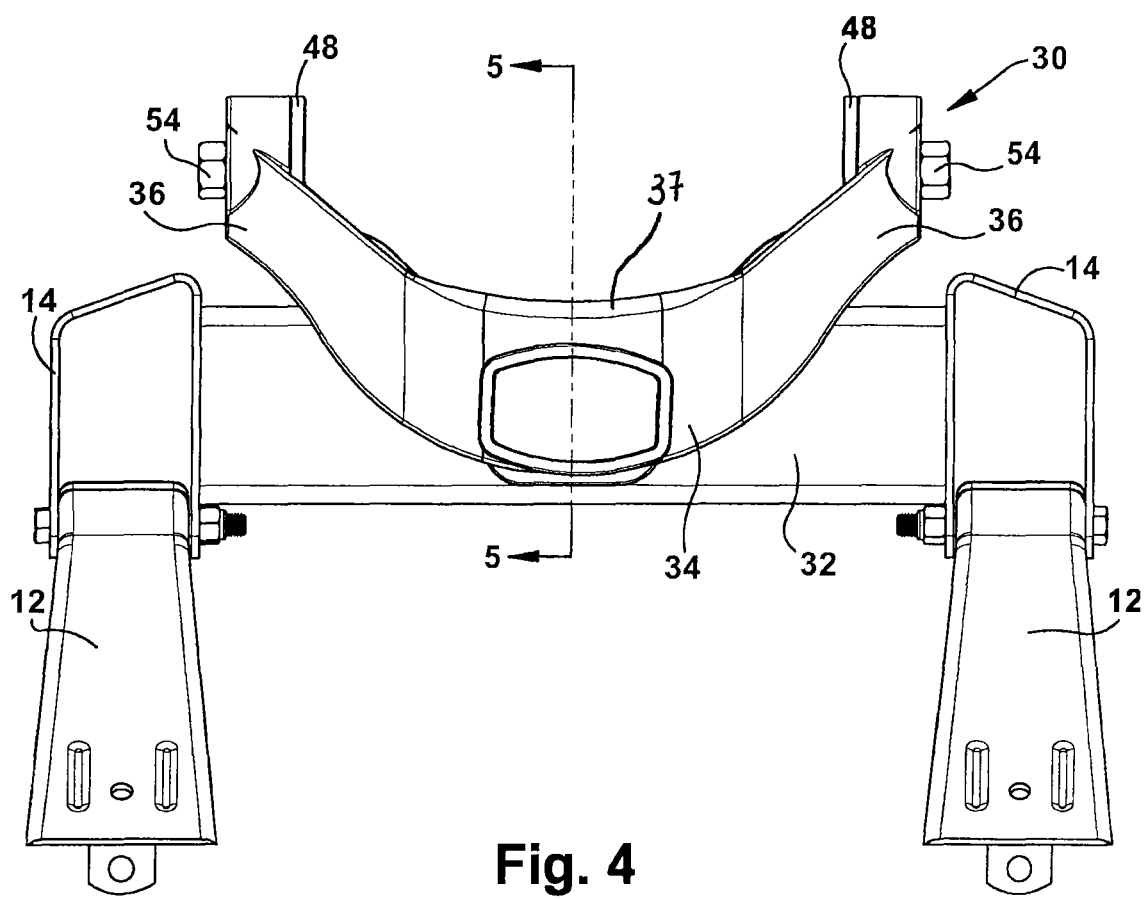
FIG. 4 is a partial front view of the isolation system in use with the fifth wheel hitch assembly of FIG. 1.

The wings 36 of the pivot beam 34 may be of any appropriate shape, size, type or configuration. By way of a non-limiting example, the wings 36 may be of a generally curved shape extending upward from a central portion 37 of the pivot beam 34, as shown in FIGS. 3 and 4. The wings 36 may be located at any appropriate position on the pivot beam 34, such as at each end of the pivot beam 34.

By way of a non-limiting example, the wings 36 may provide the pivot beam 34 with its generally curved or cradle shape, substantially saddled shape, or any other such shape that the pivot beam 34 may take. The wings 36 may also provide a mounting point to which the skid plate 18 may mount. The wings 36 may be integrally formed with the pivot beam 34 or may be separate components secured to the pivot beam 34 by any appropriate means, such as fastening, welding or the like.

The pivot beam 34 may be secured to the cross-member 32 by any appropriate means, such as with fasteners 38, 40, or in any other suitable manner. The fasteners 38, 40 may be of any appropriate shape, size, type or configuration. By way of a non-limiting example, the pivot beam 34 may be secured to the cross-member 32 with a cross-member bolt 38 and a nut 40. The fasteners 38, 40 may be located at any appropriate position on the fifth wheel hitch assembly 10, such as at a generally central location on both the cross-member 32 and the pivot beam 34. The fasteners 38, 40 may secure the pivot beam 34 to the cross-member 32. The pivot beam 34 may pivot, to a limited extent, about axis A of fastener 38, as shown in FIGS. 3 and 5.

The isolator system 30 may include at least one cross-member isolator 42. Any number of such cross-member isolator 42 may be used with the fifth wheel hitch assembly 10. The cross-member isolator 42 may provide a first degree of damping to the fifth wheel hitch assembly 10. The cross-member isolator 42 may be of any appropriate shape, size, type or configuration. By way of a non-limiting example, the cross-member isolator 42 may be of a generally cylindrical shape. The cross-member isolator 42 may be located at any appropriate position on the isolator system 30, such as between the bolt 38, cross-member 32 and pivot beam 34, an example of which is shown in FIG. 5. The cross-member isolator 42 may be fabricated out of any appropriate type of materials, such as polymers or the like. For example, the isolators 42 may be fabricated out of any appropriate type of isolation materials and be of the appropriate durometer, such as urethane, rubber, synthetic compounds and the like. The appropriate material may depend upon the temperature, load and vibration frequency being attempted to be minimized or reduced.

Figure 5:
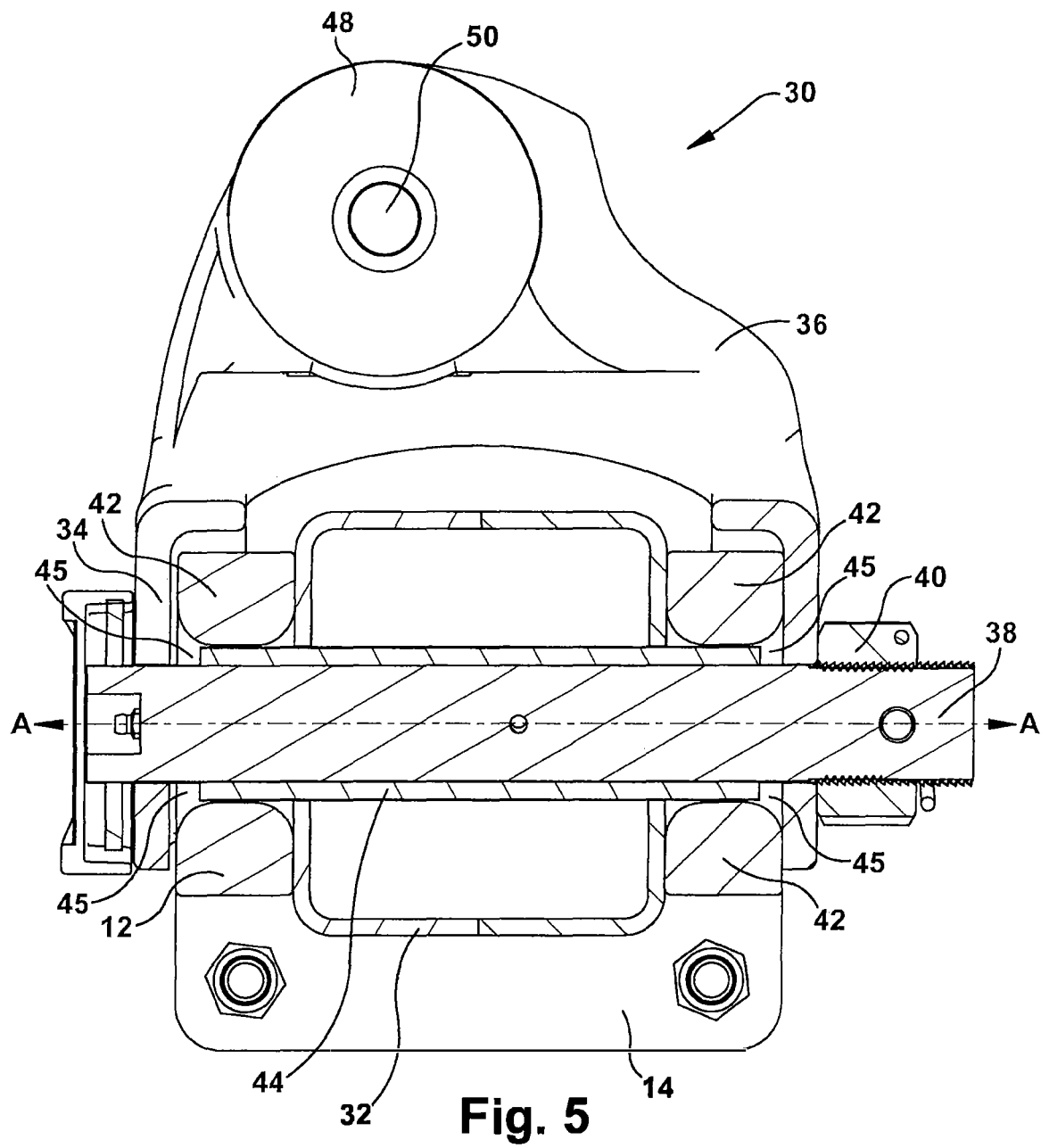
FIG. 5 is a close up cross-sectional view of an isolator of the isolation system taken along lines 5-5 of FIG. 4.

The isolator system 30 may also include a tube 44 for the bolt 38, an example of which is shown in FIGS. 2 and 5. The tube 44 may be of any appropriate shape, size, type or configuration, such as of a generally cylindrical shape. By way of a non-limiting example, the tube 44 may be of a slightly larger diameter than that of the bolt 38, whereby the tube 44 may be able to slide over the bolt 38.

The tube 44 may be located at any appropriate position on the isolator system 30, such as extending through the cross-member 32 and pivot beam 34, which can be seen in FIG. 5. The tube 44 may be secured to the isolator system 30 by any appropriate means. By way of a non-limiting example, the tube 44 may be welded to the cross-member 32, which may allow the tube 44 to ground out too large of shocks that may occur during operation thereof.

In use, the fifth wheel pivot beam 34 may rest on the cross-member 32 by means of the bolt 38 passing through both the pivot beam 34 and the cross-member 32. The bolt 38 may restrict radial movement of the pivot beam 34 about the axis A. The bolt 38, however, may not prevent the pivot beam 34 from displacing axially along the axis A of the bolt 38. This may allow the isolator 42 to absorb shock as it is compressed axially along the bolt 38 by the moving pivot beam 34.

The bolt 38 may be positioned inside of the tube 44, which may be attached through the cross-member 32. The tube 44 may be wider than the cross-member 32, however, not as wide as the pivot beam 34, thereby leaving a gap 45 into which the cross-member isolator 42 can move. This gap 45 may provide for a large contact area between the isolator 42 and the outside of the cross-member 32 and the isolator 42 and the inside of the pivot beam 34. While allowing the isolator 42 to move, the tube 44 may also limit the amount of movement permitted. The tube 44 may also stop the pivot beam 34 from completely compressing the cross-member isolator 42.

The isolator system 30 may include at least one wing isolator 48 for each wing 36 of the pivot beam 34. The wing isolators 48 may provide a second degree of damping to the fifth wheel hitch assembly 10. The wing isolators 48 may be of any appropriate shape, size, type or configuration. By way of a non-limiting example, the wing isolators 48 may be of a generally cylindrical shape. The wing isolators 48 may be located at any appropriate position on the isolator system 30, such as on the pivot beam 34 adjacent each wing 36, an example of which is shown in FIGS. 2-5. The wing isolators 48 may be fabricated out of any appropriate type of materials, such as polymers or the like. By way of a non-limiting example, the isolators 48 may be fabricated out of any appropriate type of isolation materials and be of an appropriate durometer, such as urethane, rubber and synthetic compounds. The appropriate material may depend upon the temperature, load and vibration frequency being attempted to be minimized or reduced.

The wing isolators 48 may be secured to the wings 36 by any appropriate means, such as with fasteners 50, 52, 54. By way of a non-limiting example, the wing isolators 48 may be secured to the wings 36 with a wing bolt 50, a washer 52, and a nut 54. The fasteners 50, 52, 54 may be of any appropriate shape, size, type or configuration. The fasteners 50, 52, 54 may be located at any appropriate position on the isolator system 30, such as adjacent the wings 36. The fasteners 50, 52, 54 may secure the wing isolators 48 to the wings 36 of the pivot beam 34. The pivot beam 34 may be utilized to secure the skid plate 16, whereby the skid plate 16 may pivot, to a limited extent, about axis B of fasteners 50 as shown in FIGS. 2 and 3.

The isolator system 30 may dampen vibrations, such that may result from the road, tire, engine and other frequencies occurring in operating the towing vehicle and towed vehicle, and impacts, such as from an uneven road or loose connection impacts, radially allowing the skid plate 16 to pivot. The isolator system 30 may provide vertical and horizontal isolation about the A and B axes, however, side to side isolation may also be provided without departing from the present teachings.

The isolator system 30 of the fifth wheel hitch assembly 10 includes isolators 42, 48 that may focus on the shocks of the towed vehicle the fifth hitch assembly 10 may be secured. While the isolator system 30 of the fifth wheel hitch assembly 10 has been described as having a certain number or type of isolators, it is to be understood that the fifth wheel hitch assembly 10 may have any appropriate number or type of isolators and should not be limited to that shown or described herein.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof

Having thus described the invention, the following is claimed:

1. A fifth wheel hitch comprising:
a pair of support frames selectively attachable to load bed of a towing vehicle;
a cross-member positioned between the pair of support frames;
a beam rotationally secured with said cross-member;
a skid plate rotationally secured to said beam, wherein said skid plate rotates about a transverse axis; and
a dampener engaged with said beam, wherein said dampener dampens radial displacement of said skid plate along 360 degrees of said transverse axis while allowing free rotation of said skid plate about said transverse axis;
a cross-member isolator engaged with said beam about a second axis, wherein said dampener dampens longitudinal displacement of said beam generally along said second axis;
a fastener extending through at least a portion of and securing together said beam and cross-member; and
a tube surrounding at least a portion of said fastener within said beam.

2. The fifth wheel hitch of claim 1, wherein said tube extends through an entire width of said cross-member creating a gap into which said cross-member isolator is capable of moving.

3. The fifth wheel hitch of claim 2, wherein said cross-member isolator dampens shock as it is compressed axially along said fastener.

4. A fifth wheel hitch comprising:
a pair of support frames selectively attachable to load bed of a towing vehicle;
a pair of mounting brackets attached with the pair of support frames;
a cross-member positioned between the pair of mounting brackets;
a beam secured with said cross-member about a first axis; and
a dampener secured to said beam about said first axis, wherein said dampener dampens longitudinal displacement of said beam generally along said first axis;
a cross-member isolator engaged with said beam about a second axis, wherein said dampener dampens longitudinal displacement of said beam generally along said second axis;
a fastener extending through at least a portion of and securing together said beam and cross-member; and
a tube surrounding at least a portion of said fastener within said beam.

5. The fifth wheel hitch of claim 4 further comprising a skid plate rotationally secured to said beam, wherein said skid plate rotates about a transverse axis.

6. The fifth wheel hitch of claim 5 further comprising a second dampener engaged with said beam, wherein said second dampener dampens radial displacement of said skid plate along 360 degrees of said transverse axis while allowing free rotation of said skid plate about said transverse axis.

7. The fifth wheel hitch of claim 6, wherein the second dampener comprises rubber.

8. The fifth wheel hitch of claim 4, wherein the dampener comprises rubber.

* * * * *